United States Patent [19]
Davis et al.

[11] Patent Number: 5,020,754
[45] Date of Patent: Jun. 4, 1991

[54] METHOD AND APPARATUS FOR MOUNTING RADAR DETECTOR

[75] Inventors: Gregg M. Davis, Columbus, Ohio; David E. Roche, Nashua, N.H.

[73] Assignee: Valentine Research, Inc., Cincinnati, Ohio

[21] Appl. No.: 467,969

[22] Filed: Jan. 22, 1990

[51] Int. Cl.5 .............................................. F16B 47/00
[52] U.S. Cl. ................................ 248/206.3; 248/205.8; 248/291; 248/309.1
[58] Field of Search ............... 248/206.3, 206.4, 205.8, 248/291, 205.5–205.7, 206.2, 206.1, 309.1

[56] References Cited

U.S. PATENT DOCUMENTS

| | | | |
|---|---|---|---|
| 1,530,784 | 3/1925 | Midgley | 248/206.3 X |
| 2,980,379 | 4/1961 | Goldfus | 248/206.4 |
| 3,750,991 | 8/1973 | Ragir | 248/205.8 |
| 4,684,164 | 8/1987 | Durham | 296/37.7 |
| 4,684,572 | 3/1987 | Sokol | 248/206.2 |
| 4,725,840 | 2/1988 | Orazietti | 342/20 |
| 4,836,482 | 6/1989 | Sokol | 248/206.3 |
| 4,846,429 | 7/1989 | Scheurer et al. | 248/205.8 |
| 4,863,130 | 9/1989 | Marks, Jr. | 248/206.3 |
| 4,896,855 | 1/1990 | Furnish | 248/291 |

Primary Examiner—Alvin C. Chin-Shue
Attorney, Agent, or Firm—Killworth, Gottman, Hagan & Schaeff

[57] ABSTRACT

Two suction cups are used to stably secure a radar detector or other device to the interior of a windshield of a motor vehicle, yet the suction cups are readily removed from the windshield by application of a single removal force which is applied to the suction cups, preferably simultaneously. The suction cups are each provided with an apertured protrusion or ear. The apertures of the ears receive a release bar which extends between the two cups and permits a single force to release both cups substantially simultaneously. The release bar includes an operating tab which can be activated by a user's thumb or finger(s) while the thumb or finger(s) and palm of one of the user's hands extend under the device. In this way, a radar detector or other device can be mounted by grasping it in one hand and forcing it against the windshield and removed from the windshield by the force of the grasping motion of one hand.

10 Claims, 4 Drawing Sheets

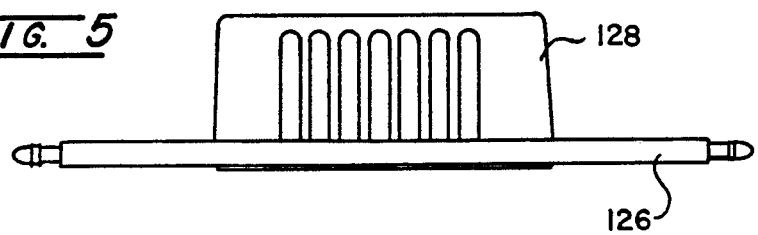
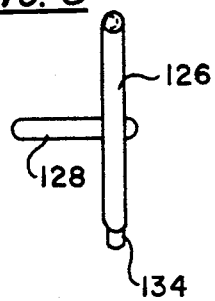
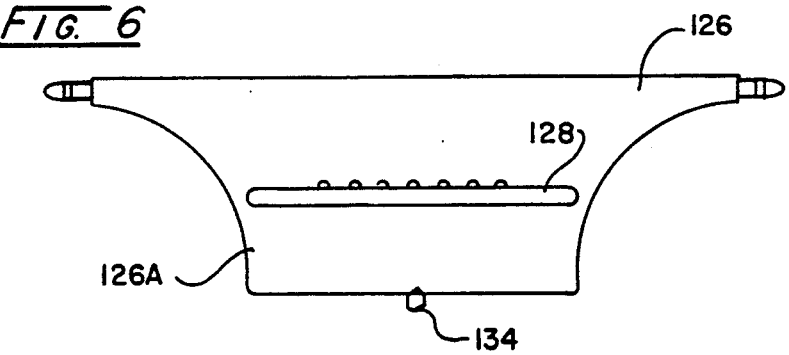
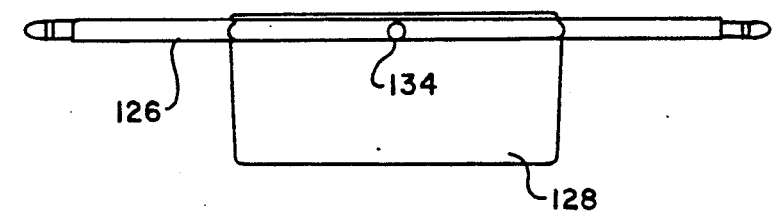

METHOD AND APPARATUS FOR MOUNTING RADAR DETECTOR

BACKGROUND OF THE INVENTION

The present invention relates generally to radar detectors or other devices which can be mounted to the interior of a windshield of a motor vehicle and, more particularly, to a method and apparatus for mounting such devices so that they can be rapidly secured to the windshield and rapidly removed therefrom.

Radar detectors are preferably mounted in motor vehicles to have an unobstructed view through the windshield of the vehicle. Such mountings provide a direct line-of-sight view of the road ahead of the vehicle for the antenna of the detector to best receive radar signals to be detected. One of three forms of mounting is normally provided: (1) a device using suction cups such as disclosed in U.S. Pat. No. 4,648,572 wherein a mount is secured to the windshield by one or more suction cups and in turn supports the radar detector; (2) a device using spring clips or the like for clipping the radar detector to a sun visor; and, (3) a device which more permanently secures a radar detector to or within a vehicle such as disclosed in U.S. Pat. No. 4,684,164.

Each of the currently available mounting designs has disadvantages. In the case of the visor mounts, use of the visor becomes difficult, if not impossible, whenever the radar detector is in use. In addition, the operating mechanism of the visor can be damaged by having to support the additional weight of the radar detector, and repeated attachment and removal of the radar detector to the visor can damage or disfigure the visor and thus the appearance of the interior of the motor vehicle. In the case of permanent installation of a radar detector, it cannot be conveniently removed to prevent theft or so that it can be used in more than one motor vehicle. Further, permanent installation often requires substantial labor and alterations resulting in inconvenience and expense.

In contrast to the preceding, the use of suction cups to mount a radar detector has many advantages. For example, the radar detector can be installed and removed considerably more easily. The use of suction cups permits flexible installation such that the user can select almost any position on the interior of the windshield of a motor vehicle for installation. No alterations of the vehicle are required and no additional hardware is required for installation. It is apparent that suction cup mountings are particularly convenient for users who commonly use more than one vehicle from time to time.

Unfortunately, in spite of the advantages of suction cups, currently available suction cup mounts include some very annoying disadvantages. For example, if only one suction cup is used, the mount tends to be unstable and the radar detector may rotate around the axis of the suction cup as the motion of the vehicle applies constantly changing forces to the radar detector. Further, improper installation can cause the single suction cup to fail, dropping the radar detector from its installed position on the windshield.

Mounts using more than one suction cup are difficult to align upon installation due to a common problem inherent in all currently available suction cup mounts: once installed, the suction cup mounts are difficult to remove from the windshield. In an attempt to alleviate the removal problem, some mounts include suction cups with a protrusion or "ear" attached to the outer periphery of the cups. By pulling the ear, the seal around the suction cup is broken removing the vacuum within and detaching the suction cup from the windshield. Unfortunately, such protrusions are normally difficult to reach and, for mounts using more than one suction cup, each cup must be individually detached using its own ear. Further, for all currently available suction cup mounts, it is difficult if not impossible to both manipulate the ear(s) of the suction cup(s) and to properly support the radar detector or other supported device as it is disconnected from the interior of the windshield, particularly with one hand.

Accordingly, there is a need for an improved mounting arrangement for securing radar detectors and other devices to the interior of a windshield of a motor vehicle so that they can be rapidly secured to the windshield and rapidly removed therefrom. Preferably, the mounting arrangement would utilize suction cups to capitalize on their inherent advantages, and permit rapid installation and removal using only one hand.

SUMMARY OF THE INVENTION

This need is met by the method and apparatus of the present invention wherein two or more suction cups are used to stably secure a radar detector or other device to the interior of a windshield of a motor vehicle, yet the suction cups are readily removed from the windshield by application of a single removal force which is applied to all suction cups, preferably simultaneously. In the preferred embodiment, two suction cups are provided with each having an apertured protrusion or ear. The apertures of the ears receive a release bar which extends between the two cups and permits a single force to release both cups substantially simultaneously. The release bar includes an operating tab which can be activated by a user's thumb or finger(s) while the thumb or finger(s) and palm of one of the user's hands extend under the device. In this way, a radar detector or other device can be grasped by one hand and removed from the windshield by the force of the grasping motion of one hand.

In accordance with one aspect of the present invention, apparatus for mounting a radar detector or other device to the interior of a windshield of a motor vehicle comprises a bracket for receiving and supporting the radar detector or other device. At least two suction cups are secured to the bracket for mounting the bracket to the interior of the windshield. To facilitate removal of the bracket, bracket removal means are coupled to the suction cups for releasing them in response to the application of a removal force to the bracket removal means.

The bracket removal means comprises release means formed on each of the suction cups for lifting each cup to release the vacuum which holds it to the interior of the windshield. Removal actuator means are coupled to the release means of all of the suction cups for applying a force thereto in response to the application of a removal force to the removal actuator means. Thus, a single removal force applied to the removal actuator means applies a corresponding force to all of the release means to substantially simultaneously release all of the at least two suction cups. Preferably, the release means comprises an apertured protrusion formed near a peripheral edge of each of the suction cups and the removal actuator means is coupled to the apertured protrusions.

Preferably, the apparatus comprises two suction cups and the removal actuator means comprises a release bar extending between the apertured protrusions of the two suction cups, the release bar being movably coupled to the bracket. In the illustrated embodiment, the release bar is pivotally mounted to the bracket and defines an operating tab for pivotally moving the release bar to transfer a removal force applied to the operating tab to the apertured protrusions of the two suction cups.

In accordance with another aspect of the present invention, apparatus for mounting a radar detector or other device to the interior of a windshield of a motor vehicle comprises first and second suction cups including mounting members. A bracket for receiving and supporting the radar detector or other device includes first and second sockets for receiving the mounting members of the first and second suction cups, respectively. Bracket removal means are coupled to the first and second suction cups for releasing them in response to application of a removal force to the bracket removal means. Preferably, the first and second suction cups each include an apertured protrusion formed near a peripheral edge thereof and the bracket removal means is coupled to the apertured protrusions of the first and second suction cups.

The bracket removal means may comprise a release bar extending between the apertured protrusions of the first and second suction cups. The release bar includes an extension pivotally supported by the bracket and an operating tab projecting from the extension. Preferably, the operating tab projects substantially perpendicularly from the extension.

In accordance with yet another aspect of the present invention, a method for mounting a radar detector or other device to the interior of a windshield of a motor vehicle such that the radar detector or other device can be readily secured to and removed from the interior of the windshield comprises the steps of: mounting two suction cups onto a bracket for receiving and supporting the radar detector or other device; and, securing a quick release bar to the first and second suction cups to release substantially simultaneously the vacuum which holds the suction cups to the interior of the windshield when the release bar is operated.

It is thus an object of the present invention to provide a method and apparatus for stably mounting a radar detector or other device to the interior of a windshield of a motor vehicle by means of suction cups such that the device can be quickly attached to and removed from the windshield; to provide a method and apparatus for stably mounting a radar detector or other device to the interior of a windshield of a motor vehicle by means of suction cups such that the device can be quickly attached to and removed from the windshield, removal being performed by application of a removal force to a release tab by one hand in a natural gripping motion; and, to provide a method and apparatus for stably mounting a radar detector or other device to the interior of a windshield of a motor vehicle by means of suction cups which include apertured protrusions coupled to a release bar such that the device can be quickly attached to and removed from the windshield, removal being performed by application of a removal force to a release tab of the release bar.

Other objects and advantages of the invention will be apparent from the following description, the accompanying drawings and the appended claims.

BRIEF DESCRIPTION OF THE DRAWINGS

FIGS. 5–8 are top, front, bottom and side views, respectively, of a release bar of the present invention.

DETAILED DESCRIPTION OF THE INVENTION

Figure 1:
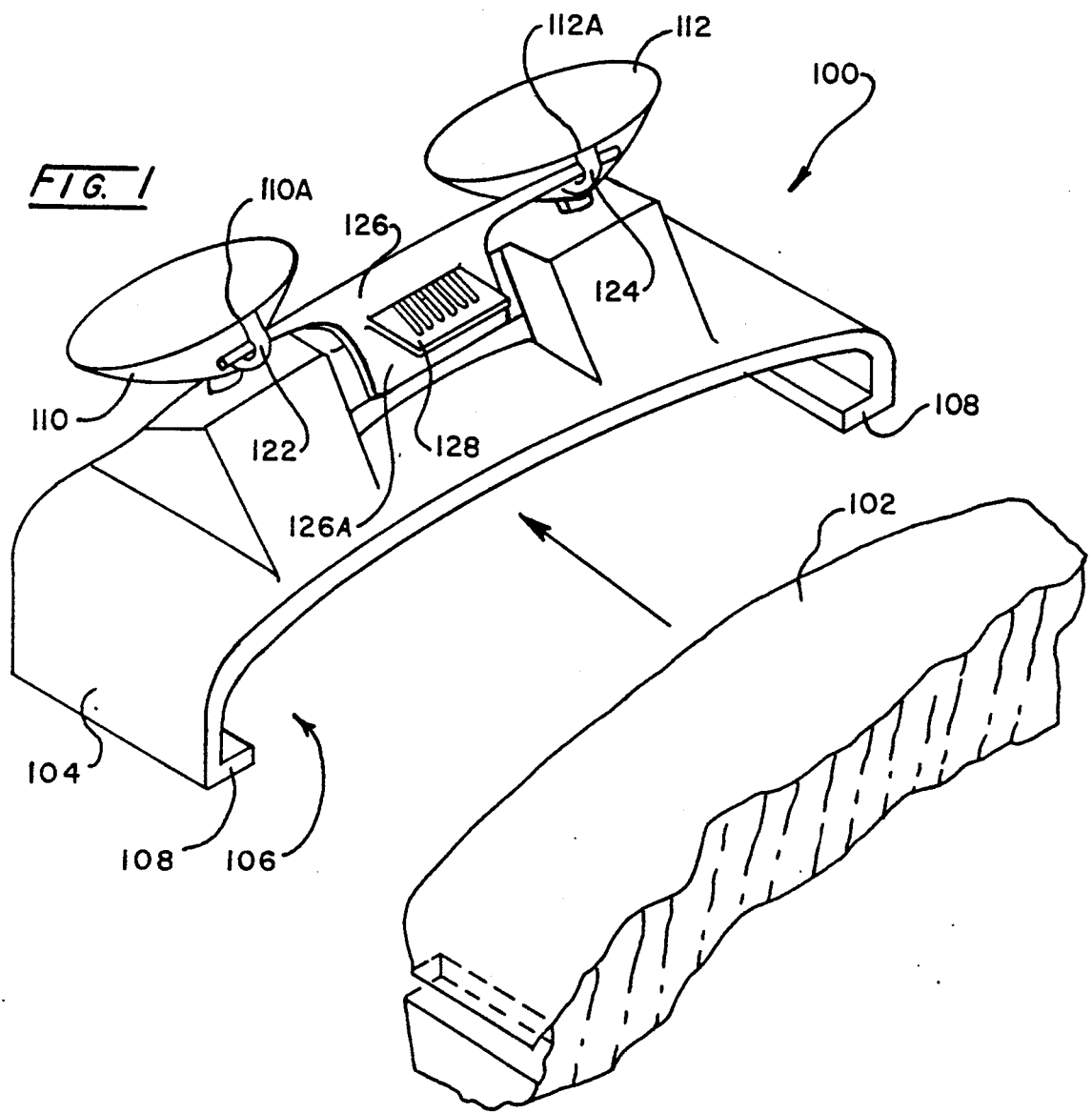
FIG. 1 is a perspective view of apparatus in accordance with the present invention for mounting a radar detector or other device to the interior of a windshield of a motor vehicle.
Figure 2:
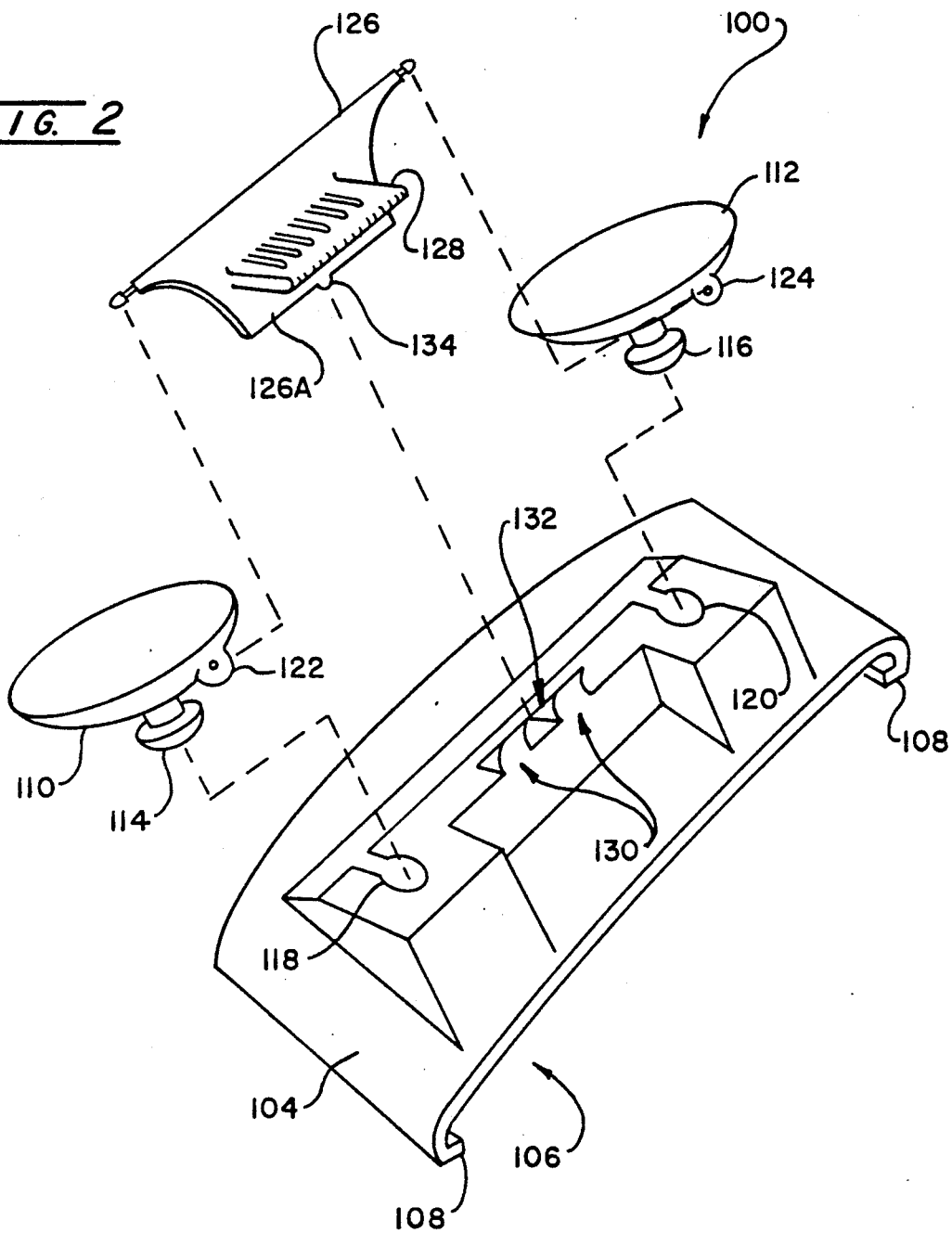
FIG. 2 is an exploded perspective view of the mounting apparatus of FIG. 1.

Mounting apparatus 100 for supporting a radar detector 102 or other device from the interior of a windshield of a motor vehicle is shown in perspective and exploded perspective views in FIGS. 1 and 2, respectively. Although generally applicable, the mounting apparatus 100 is particularly adapted and useful for mounting the radar detector 102, only a portion of which is shown in FIG. 1, and accordingly it will be described with reference to that application.

The mounting apparatus 100 includes a bracket 104 for receiving and supporting the radar detector 102 or other device within an inverted channel 106 defined between inwardly extending ribs 108. It should be apparent that the present invention is not limited to the bracket 104 but is generally applicable to a variety of bracket designs. For example, the present invention could utilize the bracket disclosed in previously referenced U.S. Pat. No. 4,648,572.

Figure 3:
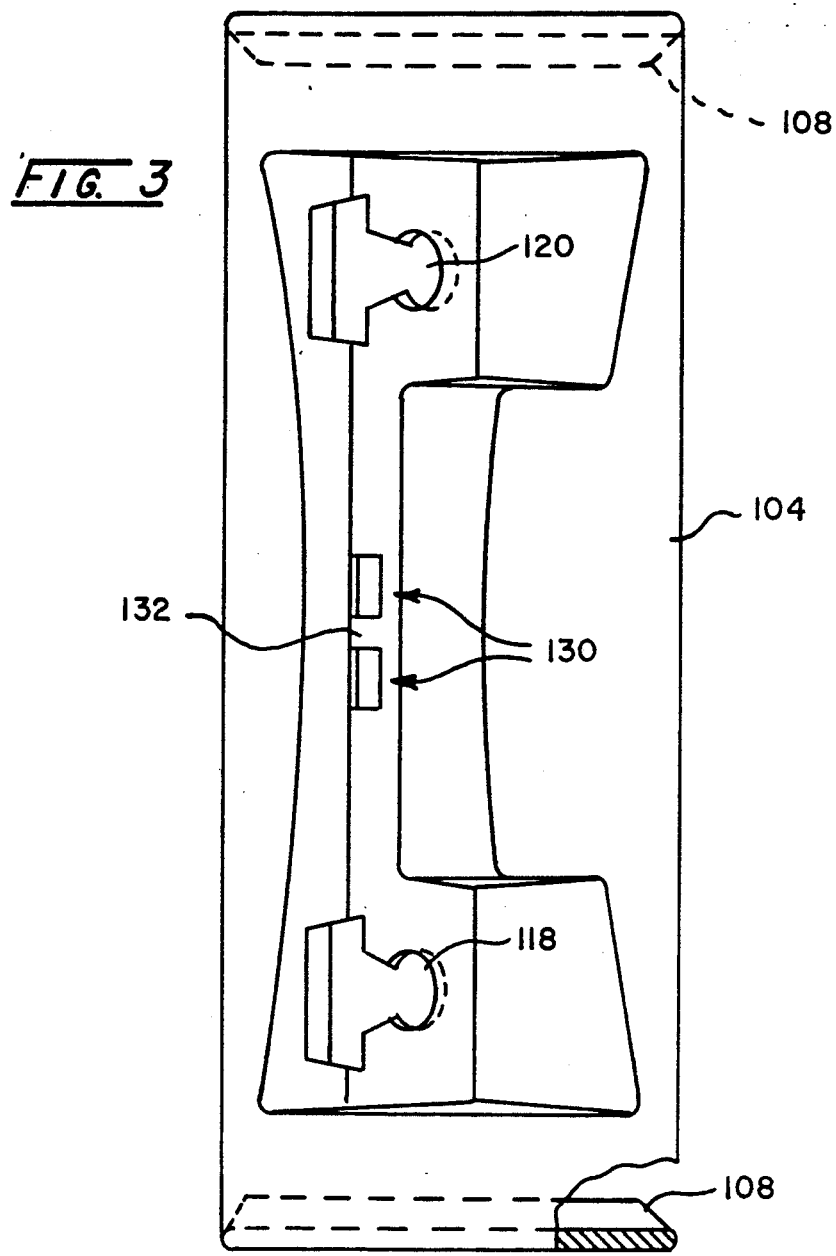
FIG. 3 is a partially broken away plan view of a mounting bracket of the present invention.
Figure 4:
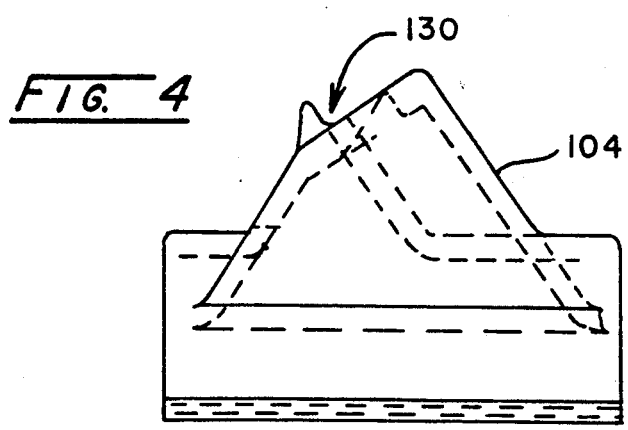
FIG. 4 is a side view of the mounting bracket of FIG. 3.

The bracket 104 is secured to a windshield by at least two suction cups. In the illustrated embodiment, two suction cups, a first suction cup 110 and a second suction cup 112, are used. The suction cups 110, 112 include mounting members 114, 116 which are received within first and second sockets 118, 120, respectively, to secure the suction cups 110, 112 to the bracket 104, see FIGS. 2 and 3. This mounting arrangement for the suction cups 110, 112 permits them to be easily replaced if worn or damaged. Bracket removal means are coupled to the suction cups 110, 112 for quickly and easily releasing the suction cups 110, 112 in response to the application of a removal force to the bracket removal means.

The bracket removal means comprises release means formed on each of the suction cups 110, 112. In the illustrative embodiment, the release means comprises apertured protrusions 122, 124 formed near rims or peripheral edges 110A, 112A of the suction cups 110, 112 for lifting the suction cups 110, 112 to release the vacuum which holds them to the interior of a windshield. The bracket removal means also comprises removal actuator means coupled to the apertured protrusions 122, 124 of the suction cups 110, 112 for applying a force thereto in response to the application of a removal force to the removal actuator means.

The removal actuator means comprises a release bar 126 extending between and received within the apertured protrusions 122, 124 of the suction cups 110, 112, and movably coupled to the bracket 104. In the illustrated embodiment, the release bar 126 is pivotally mounted to the bracket 104 by a planar extension 126A from which an operating tab 128 projects. The operating tab 128 pivotally moves the release bar 126 to transfer a removal force applied to the operating tab 128 to the apertured protrusions 122, 124 of the suction cups 110, 112.

The extension 126A of the release bar 126 is supported for pivotal movement by the bracket 104 within a cradle 130. The cradle 130 defines a locating aperture 132 near its center. The locating aperture 132 receives a locating pin 134 formed on the bottom of the extension 126A of the release bar 126. While the operating tab 128 can project from the extension 126A at an angle determined by the design of the apparatus, in the illustrated embodiment, it extends substantially perpendicularly from the extension 126A. It should be apparent that the release bar 126 could alternately be formed, for example as a cantilevered portion of the bracket 104 or otherwise.

The present invention also encompasses a method for mounting a radar detector or other device to the interior of a windshield of a motor vehicle such that the radar detector or other device can be readily secured to and removed from the interior of the windshield. The method, while believed to be apparent from the forgoing description, comprises the steps of: mounting the two suction cups 110, 112 onto the bracket 104 for receiving and supporting the radar detector 102 or other device; and, securing a quick release bar comprising the release bar 126 to the first and second suction cups 110, 112 via the apertured protrusions 122, 124 to release substantially simultaneously the vacuum which holds the suction cups 110, 112 to the interior of a windshield when the release bar 126 is operated.

A radar detector or other device which is supported by the mounting arrangement of the present invention is thus quickly and easily installed on and removed from the interior of a windshield of a motor vehicle. In particular, the device and mount can be grasped by one hand of a user, positioned as desired on the interior of the windshield and firmly forced against the windshield to securely engage the suction cups to the windshield. For removal, the device and mount are once again grasped by one hand. In the illustrated embodiment, preferably the fingers and palm of one hand are extended beneath the device and mount to securely support them and the thumb of the one hand is extended thereabove. By grasping the device and mount such that the user's thumb engages the release tab, the combination is removed from the windshield by the force of the natural grasping action of one of the user's hands.

Having thus described the method and apparatus for mounting a radar detector or other device of the present invention in detail and by reference to preferred embodiments thereof, it will be apparent that modifications and variations are possible without departing from the scope of the invention defined in the appended claims.

What is claimed is:

1. Apparatus for mounting a device such as a radar detector to the interior of a windshield of a motor vehicle, said apparatus being readily secured to and removed from the interior of said windshield and comprising:
   a bracket for receiving and supporting the radar detector or other device;
   at least two suction cups secured to said bracket for mounting said bracket to the interior of the windshield, said suction cups each having a release ear projecting outwardly adjacent a rim thereof; and
   removal actuator means comprising a release bar movably mounted to said bracket and coupled to the release ears of said suction cups for releasing said suction cups in response to movement of said release bar relative to said bracket, said movement resulting from the application of a single removal force to said release bar.

2. Apparatus for mounting a device such as a radar detector to the interior of a windshield of a motor vehicle as claimed in claim 1 wherein said single removal force applied to said release bar applies a corresponding force to the release ears of all of said suction cups to substantially simultaneously release all of said suction cups.

3. Apparatus for mounting a device such as a radar detector to the interior of a windshield of a motor vehicle as claimed in claim 1 wherein said release ears include apertures and said release bar is coupled to the apertures of said ears.

4. Apparatus for mounting a device such as a radar detector to the interior of a windshield of a motor vehicle as claimed in claim 3 wherein said apparatus comprises only two suction cups and said release bar is movably coupled to said bracket via a release bar extension.

5. Apparatus for mounting a device such as a radar detector to the interior of a windshield of a motor vehicle as claimed in claim 4 wherein said release bar is pivotally mounted to said bracket via said release bar extension and defines an operating tab for pivotally moving said release bar to transfer a removal force applied to said operating tab to said apertured ears of said two suction cups.

6. Apparatus for mounting a device such as a radar detector to the interior of a windshield of a motor vehicle, said apparatus being readily secured to and removed from the interior of said windshield and comprising:
   first and second suction cups including mounting members, said suction cups each having a release ear projecting outwardly adjacent a rim thereof;
   a bracket for receiving and supporting the device, said bracket including first and second sockets for receiving the mounting members of said first and second suction cups, respectively; and
   removal actuator means comprising a release bar movably mounted to said bracket and coupled to the release ears of said first and second suction cups for releasing said first and second suction cups in response to movement of said release bar relative to said bracket, said movement resulting from application of a single removal force to said release bar.

7. Apparatus for mounting a device such as a radar detector to the interior of a windshield of a motor vehicle as claimed in claim 6 wherein said release ears each include an aperture and said release bar is coupled to the apertures of said ears of said first and second suction cups.

8. Apparatus for mounting a device such as a radar device to the interior of a windshield of a motor vehicle as claimed in claim 7 wherein said release bar extends through the apertures of the ears of said first and second suction cups.

9. Apparatus for mounting a device such as a radar detector to the interior of a windshield of a motor vehicle as claimed in claim 8 wherein said release bar includes an extension pivotally supported by said bracket and an operating tab projecting from said extension.

10. Apparatus for mounting a device such as a radar detector to the interior of a windshield of a motor vehicle as claimed in claim 9 wherein said operating tab projects substantially perpendicularly from said extension.

* * * * *